(12) United States Patent
Young

(10) Patent No.: US 10,492,995 B2
(45) Date of Patent: *Dec. 3, 2019

(54) BOX WITH TAMPER BAND

(71) Applicant: Tessy Plastics Corporation, Elbridge, NY (US)

(72) Inventor: David Young, Syracuse, NY (US)

(73) Assignee: Tessy Plastics Corporation, Elbridge, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/726,792

(22) Filed: Oct. 6, 2017

(65) Prior Publication Data
US 2018/0028404 A1 Feb. 1, 2018

Related U.S. Application Data

(63) Continuation of application No. 14/971,182, filed on Dec. 16, 2015, now Pat. No. 9,782,326.

(60) Provisional application No. 62/092,538, filed on Dec. 16, 2014.

(51) Int. Cl.
| | |
|---|---|
| *A61J 7/00* | (2006.01) |
| *A61J 1/18* | (2006.01) |
| *B65D 41/56* | (2006.01) |
| *B65D 51/18* | (2006.01) |

(52) U.S. Cl.
CPC ............ *A61J 7/0046* (2013.01); *A61J 1/18* (2013.01); *B65D 41/56* (2013.01); *B65D 51/18* (2013.01); *B65D 2251/0015* (2013.01); *B65D 2251/0078* (2013.01)

(58) Field of Classification Search
CPC .... B65D 41/3428; B65D 41/56; B65D 41/62; B65D 2101/0038; B65D 2251/0015; B65D 2251/0078; A61J 7/0046; Y10S 215/03; Y10S 215/07; Y10S 206/828
USPC ... 220/212, 254.1, 255, 256.1, 257.2, 258.5, 220/259.4, 265–266, 270, 377; 215/228, 215/230, 251, 253–254, 256, 258, 277, 215/DIG. 3, DIG. 7; 206/459.5, 828
See application file for complete search history.

(56) References Cited

U.S. PATENT DOCUMENTS

| | | |
|---|---|---|
| 5,123,561 A | 6/1992 | Gross |
| 5,875,907 A | 3/1999 | Lay |
| 6,405,885 B1 | 6/2002 | Elliott |
| 7,303,088 B2 | 12/2007 | Sawyer et al. |
| 8,302,794 B2 | 11/2012 | Russell |

*Primary Examiner* — Chun Hoi Cheung
*Assistant Examiner* — Brijesh V. Patel
(74) *Attorney, Agent, or Firm* — Barclay Damon LLP

(57) ABSTRACT

A medicine container and a method of forming the medicine container are described herein. The medicine container includes a bottle and a bottle cap removably connected to the bottle. A dose cup is disposed over the bottle cap, the dose cup having an opening defined by a perimeter. A tamper band is monolithically coupled to the perimeter of the dose cup. The tamper band is directly connected to the bottle by a destructively attached connection.

16 Claims, 27 Drawing Sheets

FIG. 6A      FIG. 6B

BOX WITH TAMPER BAND

CROSS-REFERENCE TO RELATED APPLICATIONS

This application is a continuation of U.S. patent application Ser. No. 14/971,182 filed Dec. 16, 2015, entitled "DOSE CUP WITH TAMPER BAND", which claims the benefit of and priority to U. S. Provisional Patent Application Ser. No. 62/092,538, filed Dec. 16, 2014, entitled "DOSE CUP WITH TAMPER BAND," the entirety of the specifications for which are incorporated herein by reference.

BACKGROUND OF THE INVENTION

Dose cups are often sold attached to the top of a medicine container. The dose cup can be inverted over the bottle's cap and held to the cap and/or bottle by a thin film of plastic. For example, the thin film of plastic can cover the dose cup and the neck of the bottle. After being purchased by a consumer, the thin film of plastic is removed and the dose cup is available for use. Additionally, the underlying cap can also have a tamper band that is removed when the consumer first opens the bottle.

In certain situations, a first consumer can purchase the bottle and remove the thin film of plastic but leave the cap's tamper band in place. Subsequently, a second consumer obtains the bottle. The instructions on the bottle can, for example, direct the second consumer to not use the medication if the plastic seal is broken. These instructions are often unclear. The second consumer has no way to know the seal referenced in the instructions were referring to the plastic seal that secured the dose cup. Accordingly, the second consumer can accidently use a dose cup that is contaminated.

SUMMARY OF THE INVENTION

A system and method for a medicine container are described herein. In an embodiment, a dose cup assembly includes a dose cup with an opening at a top end of the dose cup. The dose cup is formed from a first polymeric material. A tamper band circumscribes the opening of the dose cup. The tamper band is formed from a second polymeric material.

In another embodiment, a medicine container includes a bottle and a bottle cap removably connected to the bottle. A dose cup is disposed over the bottle cap. The dose cup has an opening defined by a perimeter. A tamper band is monolithically coupled to the perimeter of the dose cup. The tamper band is directly connected to the bottle by a destructively attached connection.

In yet another embodiment, a method for forming a dose cup assembly by a two-shot method is described. The method includes injection molding a dose cup in a first shot. The dose cup has an opening defined by a perimeter. The method also includes injection molding a tamper band in a second shot such that the tamper band is monolithically attached to the perimeter of the dose cup. Injection molding the tamper band provides a dose cup assembly.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 6A-6F are illustrations of an example of a dose cup with a tamper band attached;

The attached drawings are for purposes of illustration and are not necessarily to scale.

DETAILED DESCRIPTION OF THE INVENTION

FIGS. 1A-1D depict an example of a medicine container 100. The medicine container 100 includes a dose cup 102 connected to a medicine bottle 104 with a tamper band or secure band 106. The tamper band 106 seals or couples the dose cup 102 to the medicine bottle 104 and serves to indicate if the dose cup 102 has been removed from the medicine bottle 104 and thus indicates if the dose cup 102 is unused. In the illustrated embodiment, the tamper band 106 is connected to the bottle 104 with a snap-on connection and is monolithically joined to the dose cup 102.

Figure 1A:
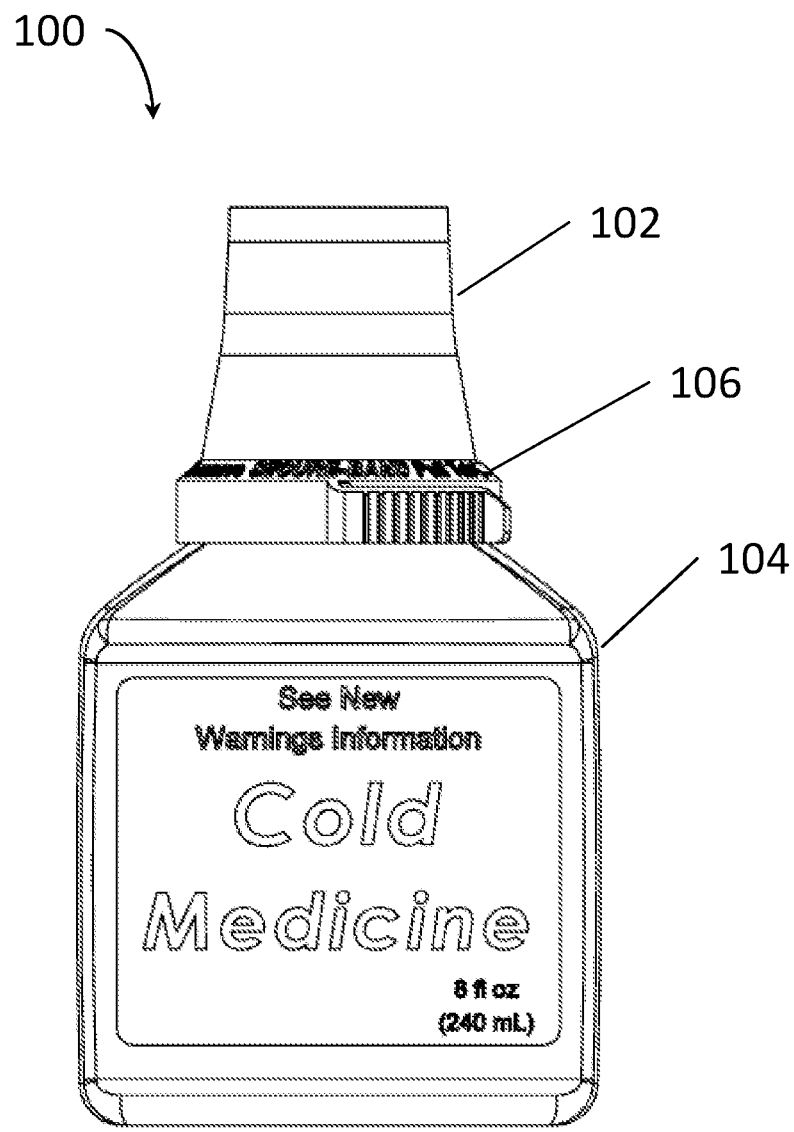
FIGS. 1A-1D are an illustrations of an example of a medicine bottle and dose cup sealed with a tamper band.
Figure 1B:
Figure 1C:
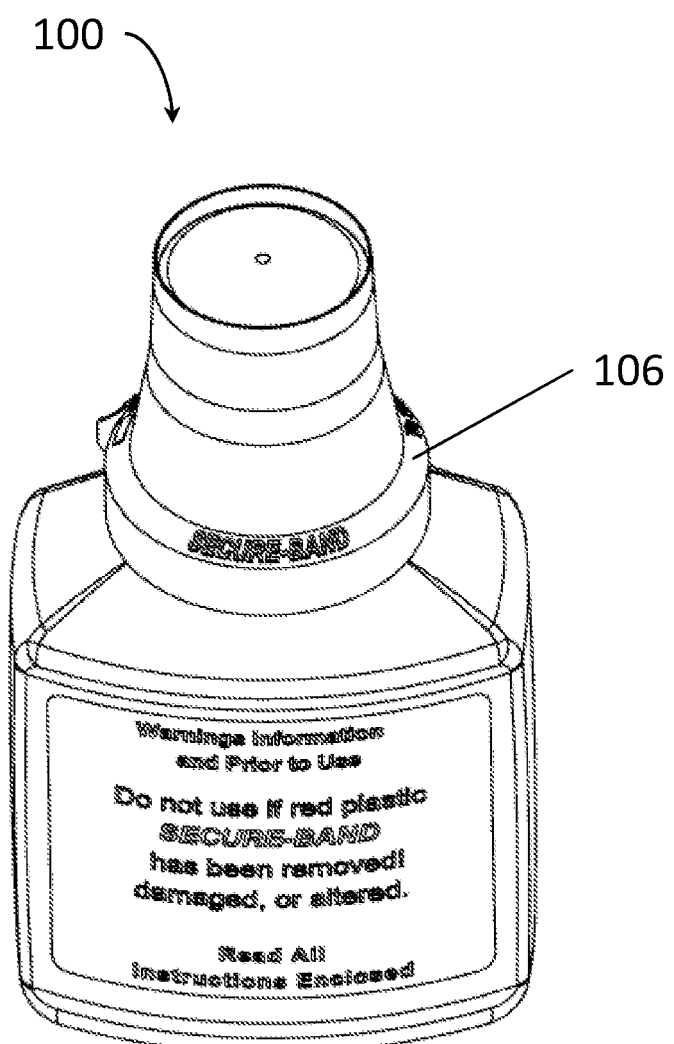
Figure 1D:
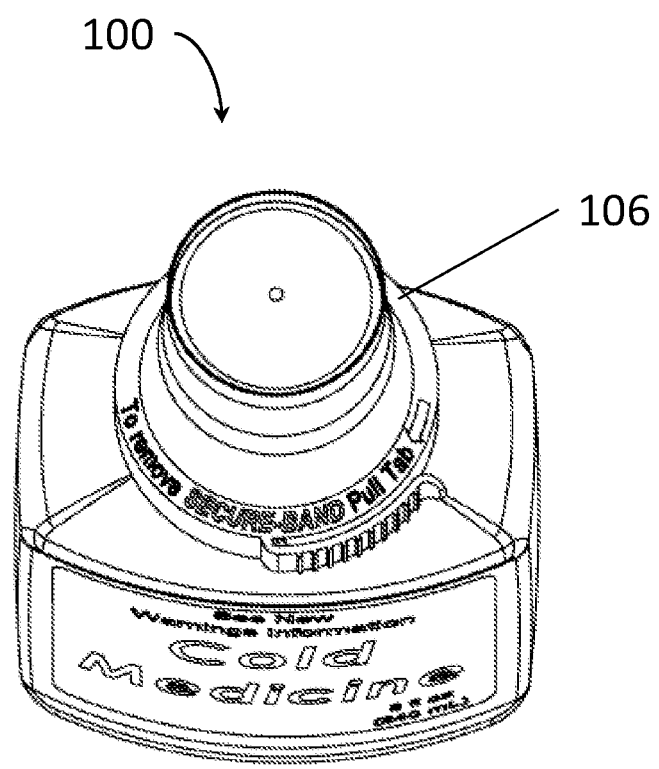
Figure 2:
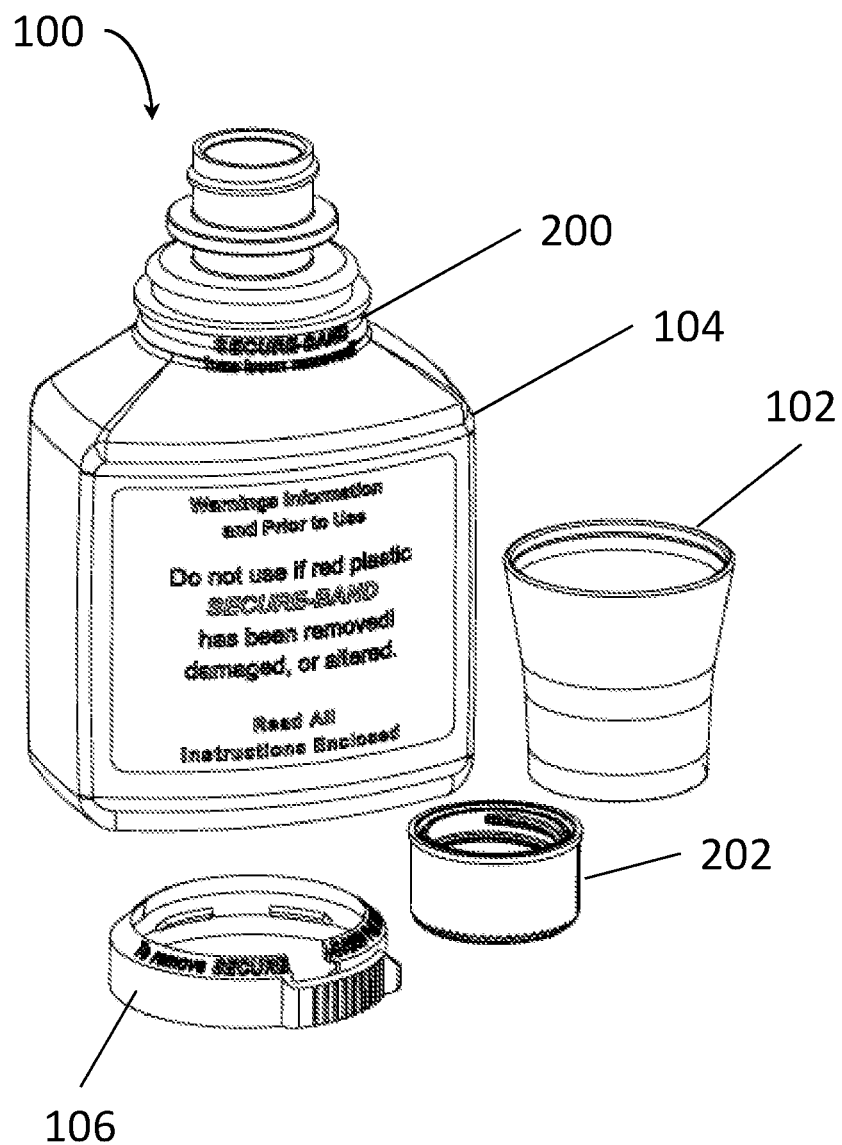
FIG. 2 is an exploded view of the medicine bottle of FIGS. 1A-1D with the tamper band removed from the dose cup and medicine bottle.
Figure 3A:
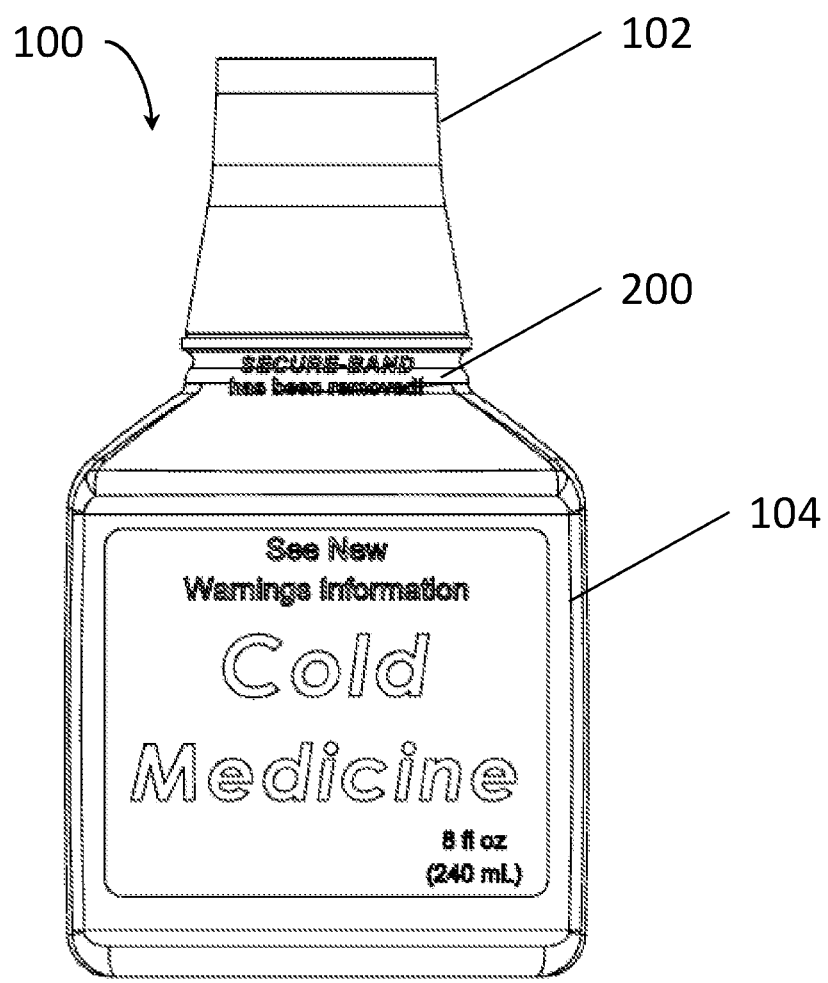
FIGS. 3A-3D are illustrations of the medicine bottle of FIGS. 1A-1D with the tamper band removed.
Figure 3B:
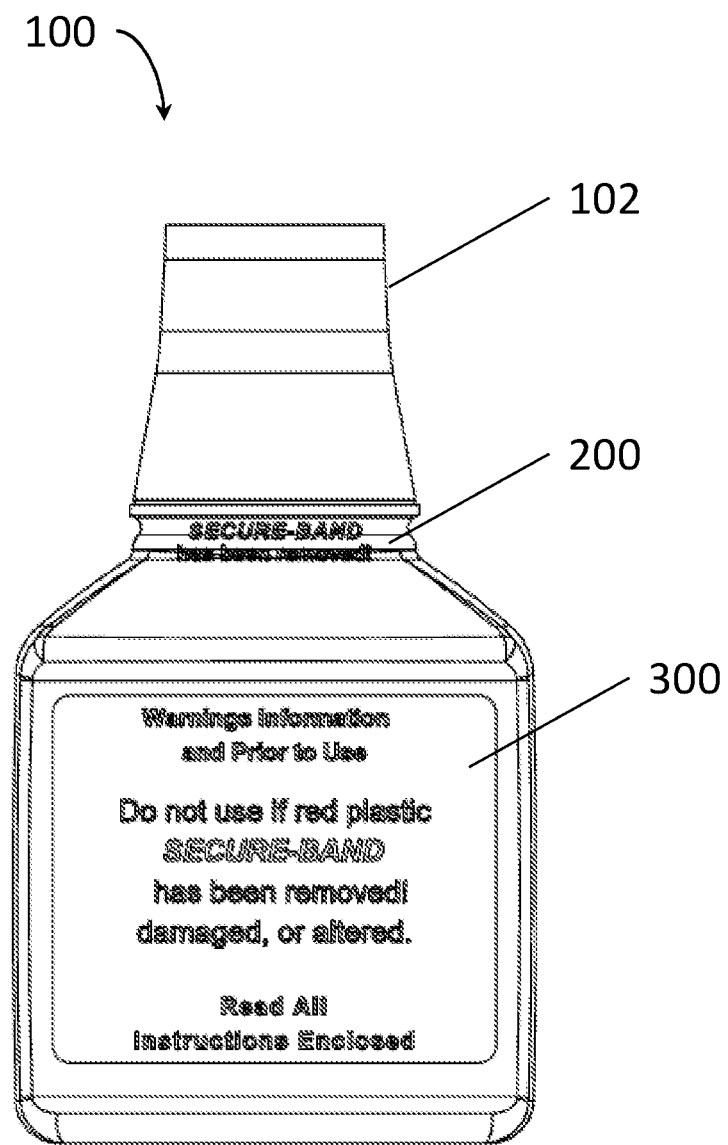
Figure 3C:
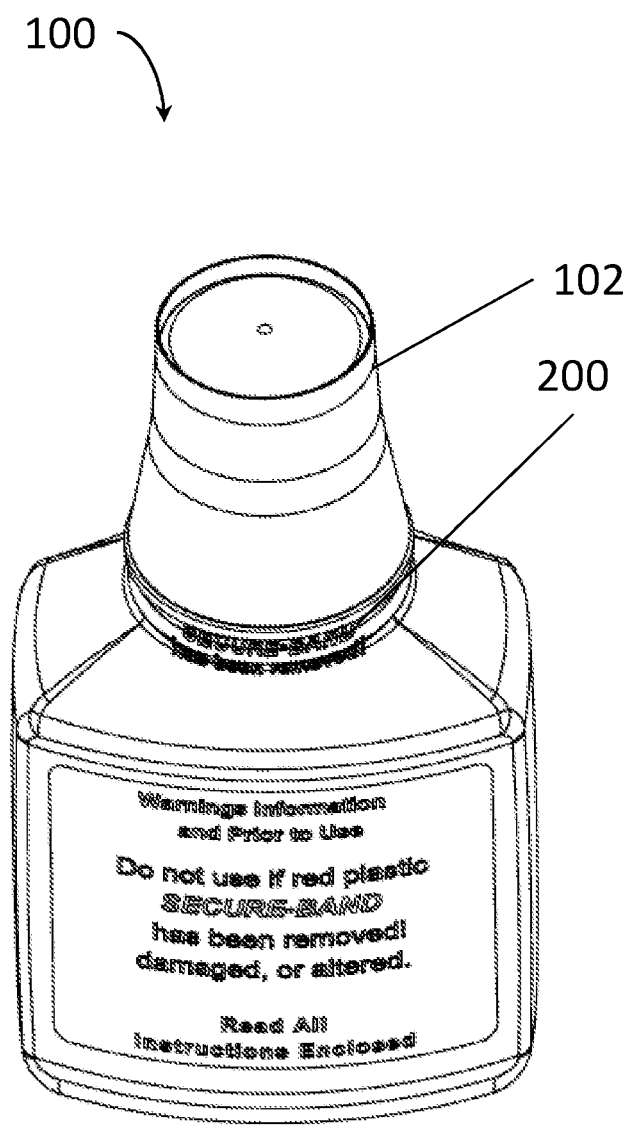
Figure 3D:
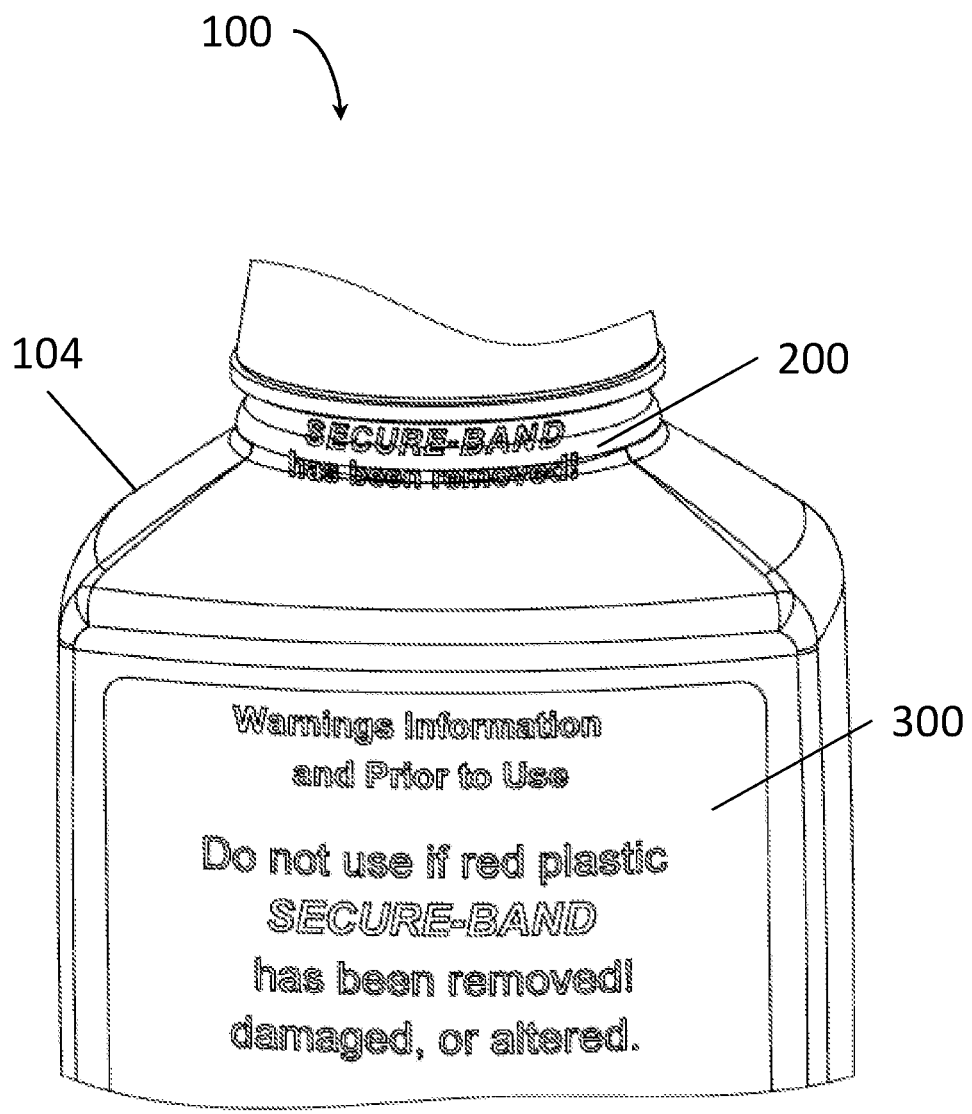
Figure 4A:
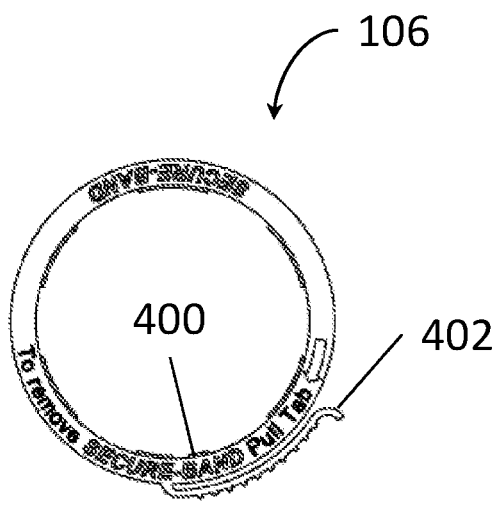
FIGS. 4A-4D are illustrations of an example of a tamper band in an unopened state.
Figure 4B:
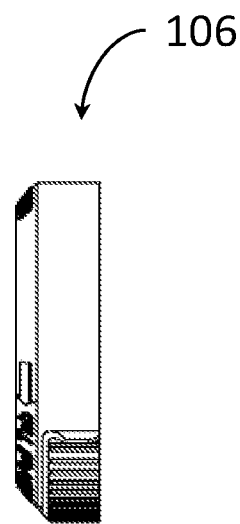
Figure 4C:
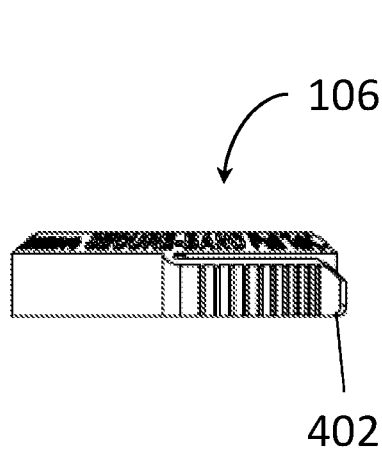
Figure 4D:
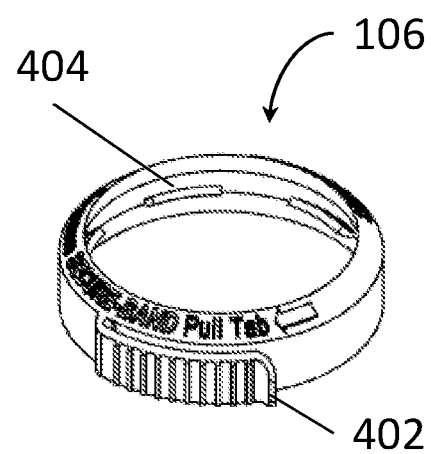
Figure 5A:
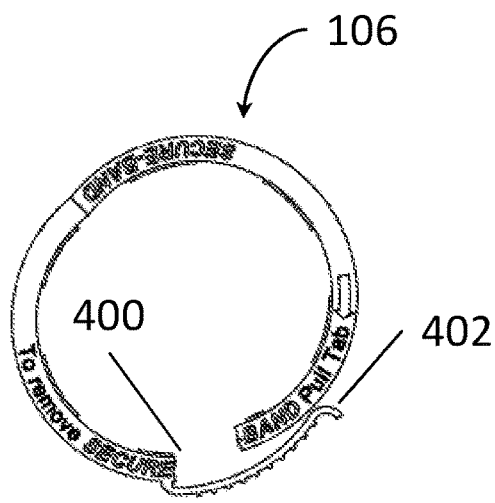
FIGS. 5A-5D are illustrations of an example of a temper band in an opened state.
Figure 5B:
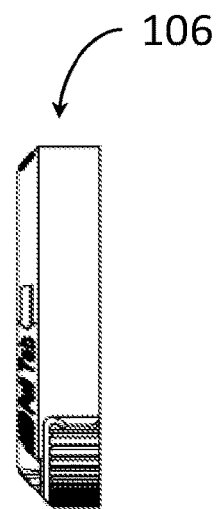
Figure 5C:
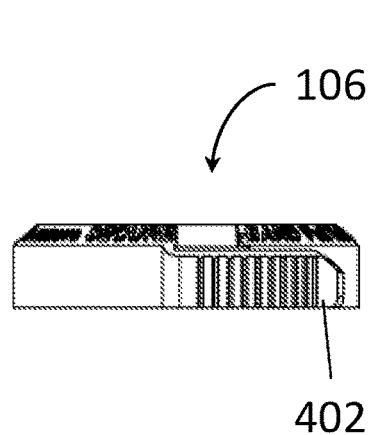
Figure 5D:
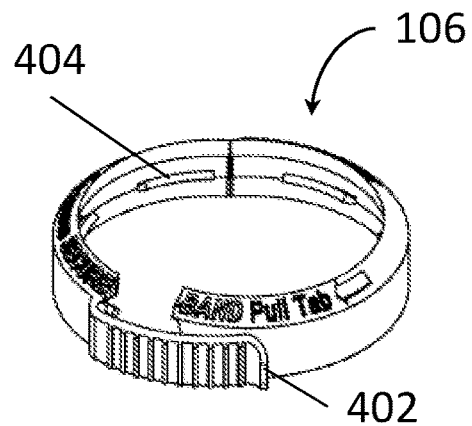

FIG. 2 depicts the medicine container 100 after the tamper band 106 has been removed from the dose cup 102 and the medicine bottle 104. In this embodiment, the tamper band 106 has been removed from the bottle 104 and severed from the dose cup 102. Because the dose cup 102 has been removed from the bottle 104, the bottle cap 202 can be unscrewed from the bottle 104. In one embodiment, the cap 202 is screwed to the bottle 104 using a child-resistant mechanism. The bottle 104 can include an indicator 200 that indicates the tamper band 106 has been removed. The indicator 200 is disposed under the tamper band 106 such that (1) the indicator 200 is obscured when the tamper band 106 is attached to the medicine container 100 and (2) the indicator 200 is visible when the tamper band 106 is removed from the medicine container 100. In the embodiment depicted in FIG. 2, the indicator 200 is the phrase "Secure-Band has been removed." In other embodiments, other indicators are used. For example, alternative colors or an alternative phrase can be displayed. In an example, the indicator 200 can be printed on a surface of the bottle or be embossed into the bottle 104 during molding.

FIGS. 3A-3D are additional illustrations of the medicine container 100 after the tamper band 106 has been removed and the indicator 200 is visible. The medicine container 100 includes printed instructions 300 (FIG. 3B) that notify the consumer that the product should not be used if the tamper band 106 has been removed. The indicator 200 uses language that corresponds to the language of the printed instructions 300. For example, the tamper band 106 is referred to as a "secure-band" in both the printed instructions 300 and the indicator 200. Additionally, the tamper band 106 can be colored to be a distinct color compared to the dose cup 102 and/or the medicine bottle 104. For example, the dose cup 102 can be clear and colorless while the tamper band 106 can be red. Thus, the printed instructions can unambiguously reference the tamper band 106 as, for example, red. In another embodiment, the indicator 200 can also be a distinct color compared to the tamper band 106, dose cup 102, and/or the medicine bottle 104.

FIGS. 4A-4D are illustrations of an exemplary tamper band 106 in an unopened state. In an example, the tamper band 106 includes a scoring mark 400 and a tab 402 that promotes manual breaking along the scoring mark 400. In an example, the tamper band 106 additionally includes a plurality of snap-on connectors 404 that attach the tamper band 106 to the medicine bottle 104. FIGS. 5A-5D illustrate the exemplary tamper band 106 in an unsealed or opened state in which the tamper band 106 has been broken along the scoring mark 400.

Figure 6C:
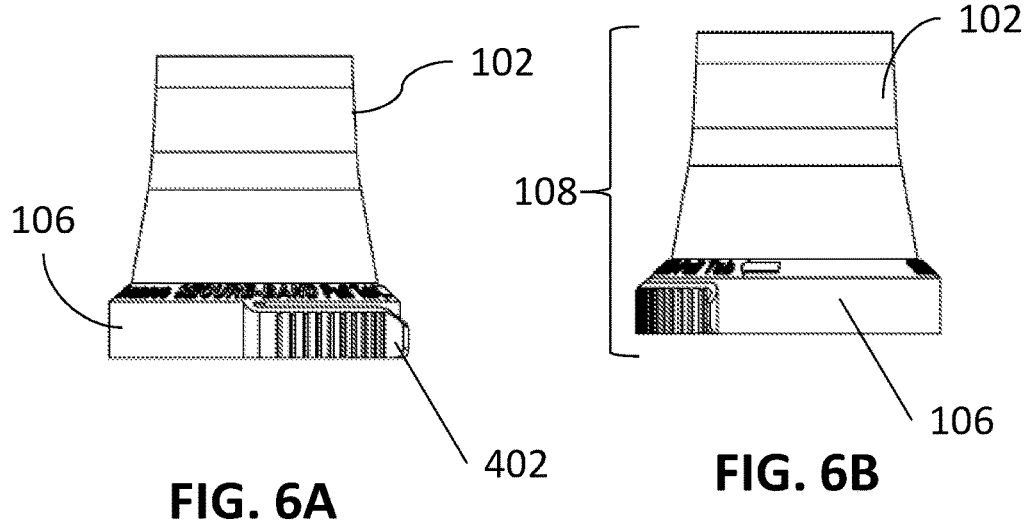
Figure 6C:
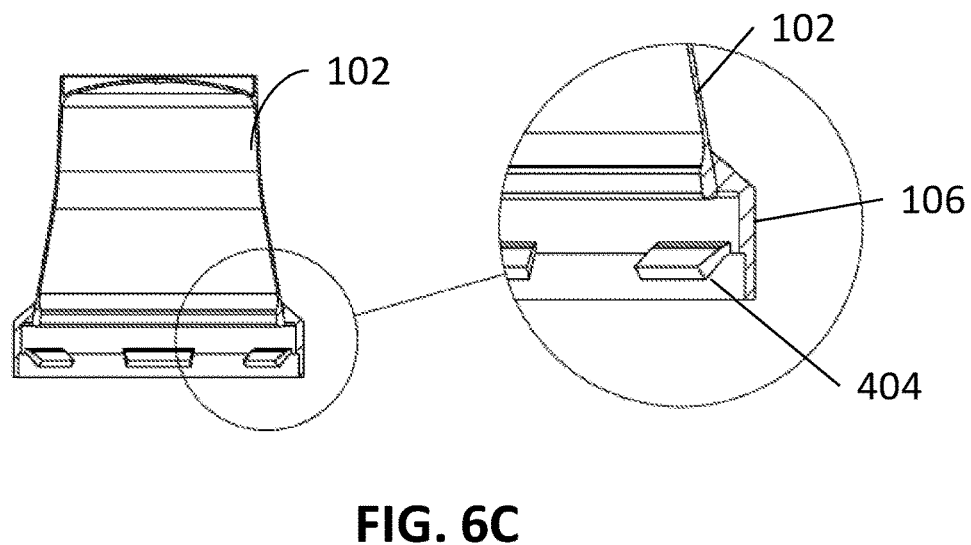
Figure 6D:
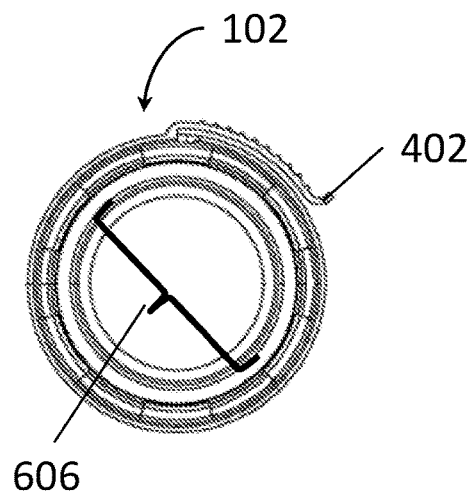
Figure 6E:
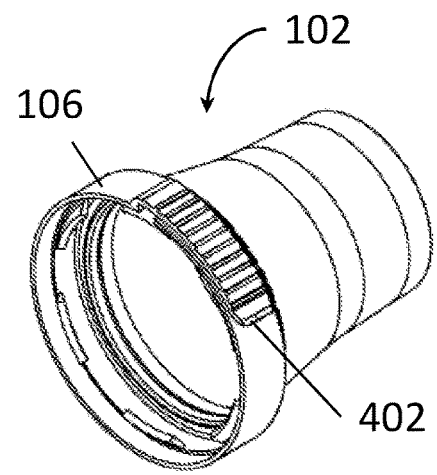
Figure 6F:
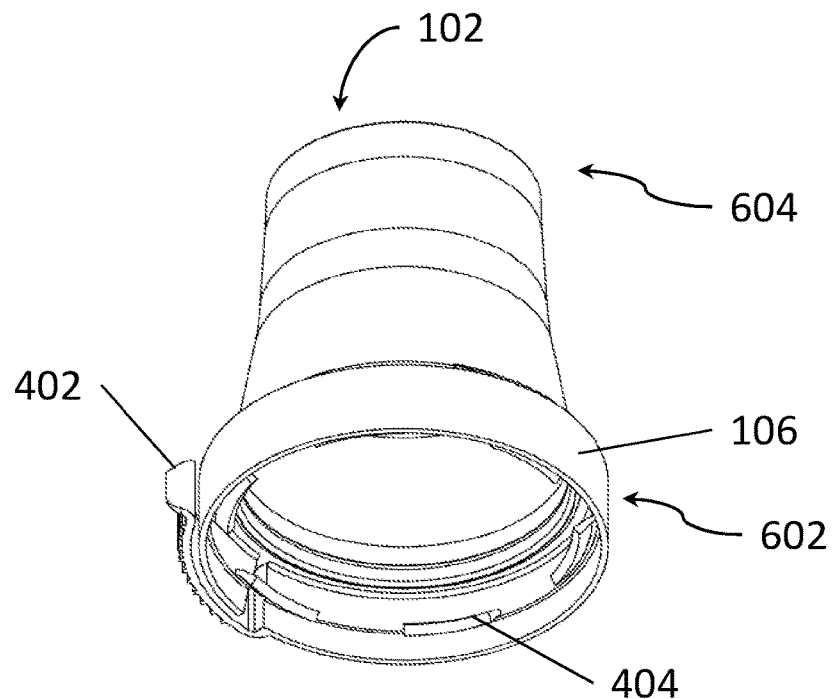

FIGS. 6A-6F are illustrations of the exemplary dose cup 102 with the tamper band 106 attached. As shown in FIG. 6F, the dose cup 102 has a first end or top end 602 and a second or bottom end 604. The top end 602 has an opening 606. The tamper band 106 couples to the dose cup 102 around the circumference of the opening 606. In this embodiment, the tamper band 106 is monolithic with the dose cup 102. In another example, a score mark (not shown) can be located at the point where the tamper band 106 meets the dose cup 102 to facilitate removal of the tamper band 106 from the dose cup 102.

Figure 7A:
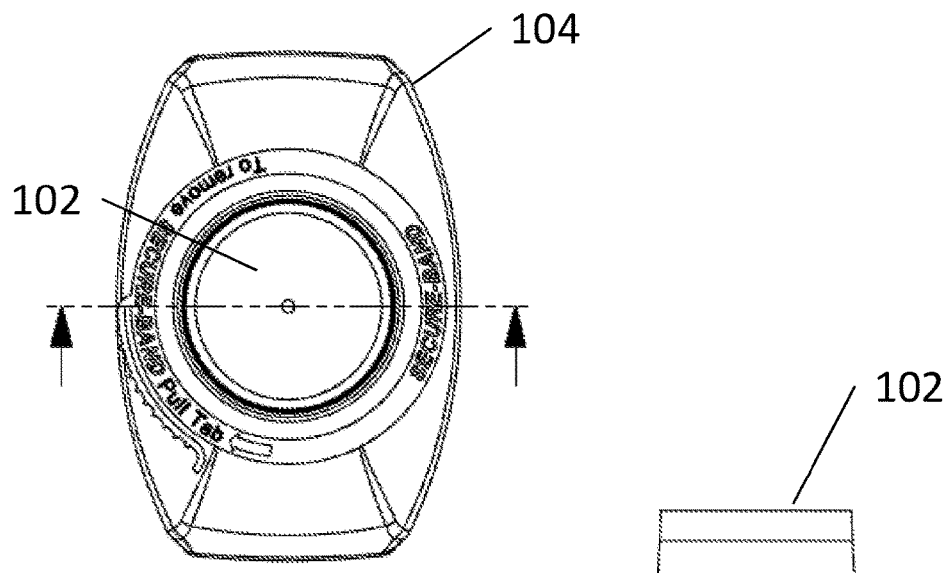
FIGS. 7A-7B are illustrations of an example of a medicine bottle and dose cup as the tamper band is connected to the medicine bottle.
Figure 7B:
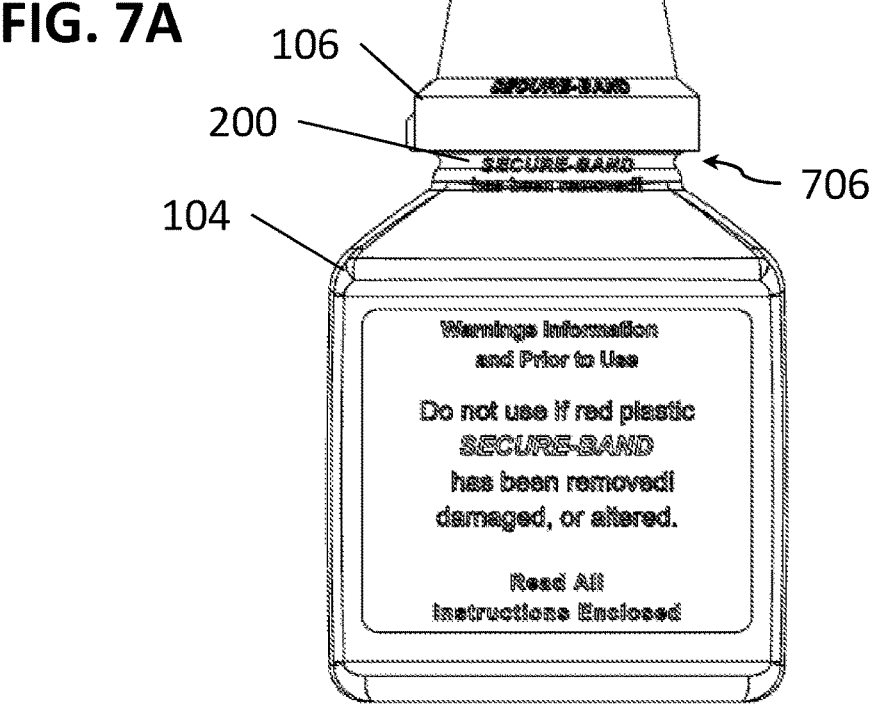
Figure 7C:
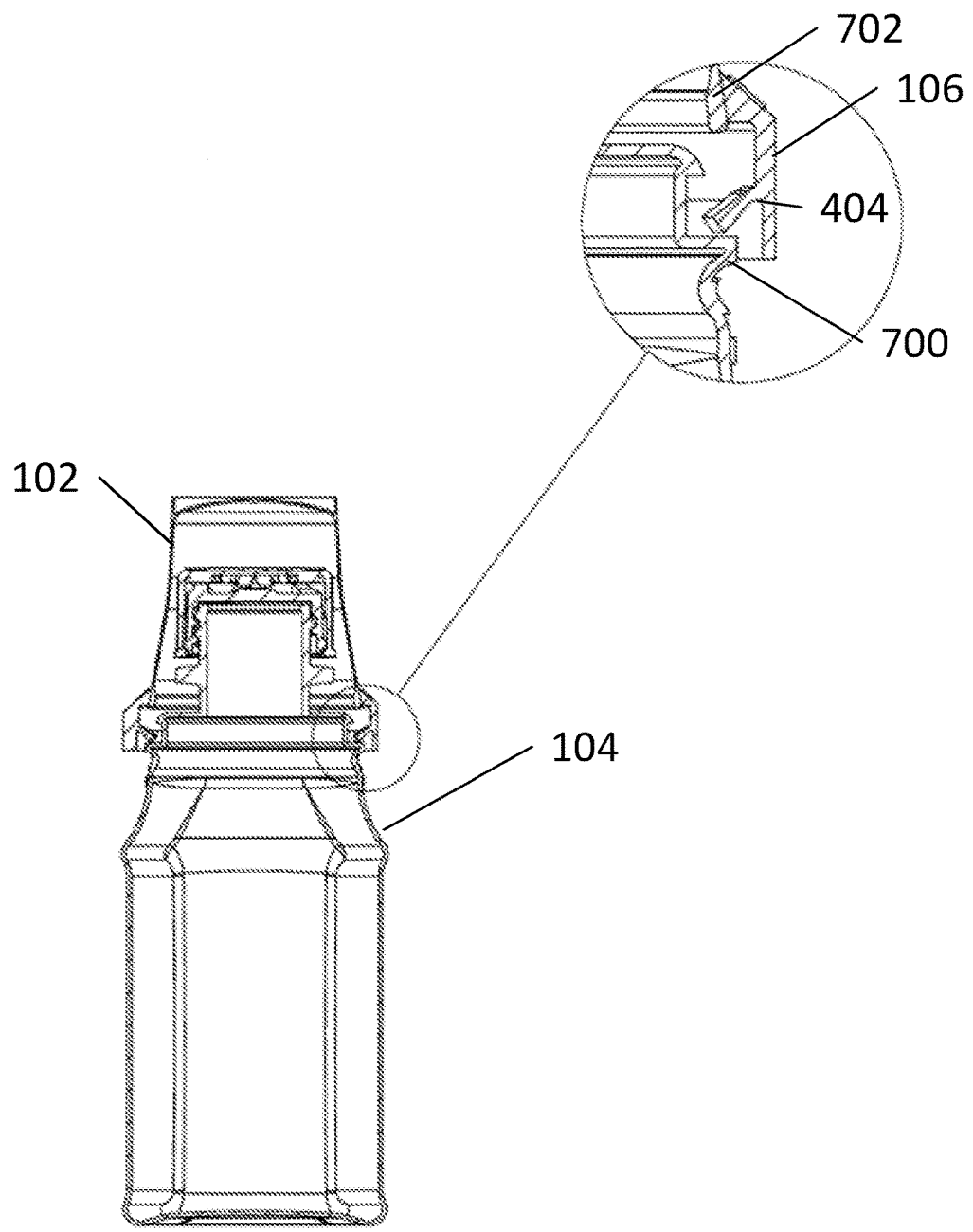
FIG. 7C is a cross-sectional view of the medicine bottle of FIGS. 7A-7B.
Figure 8A:
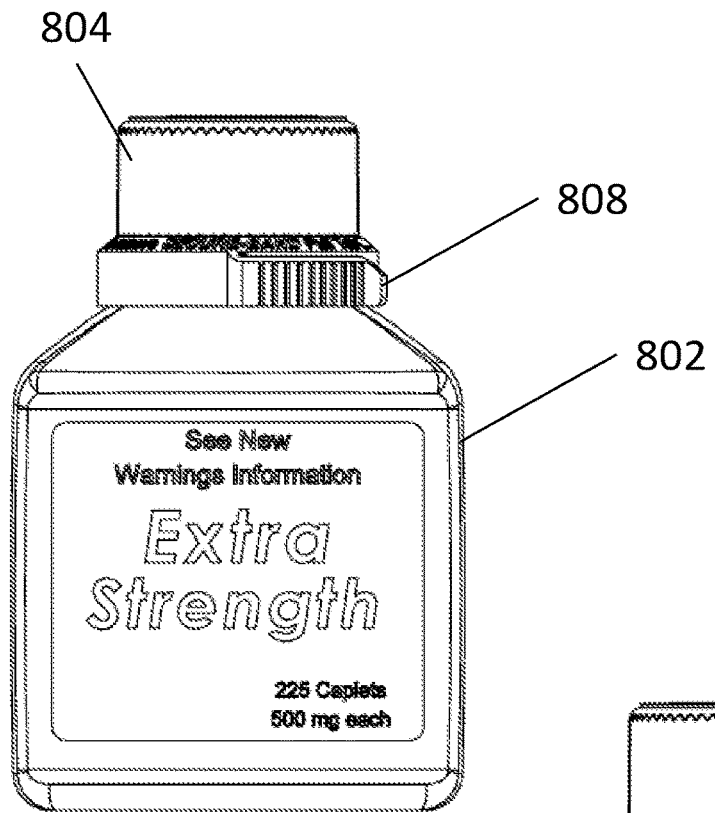
FIGS. 8A-8D are illustrations of an example of a medicine bottle with a cap sealed with a tamper band.
Figure 8B:
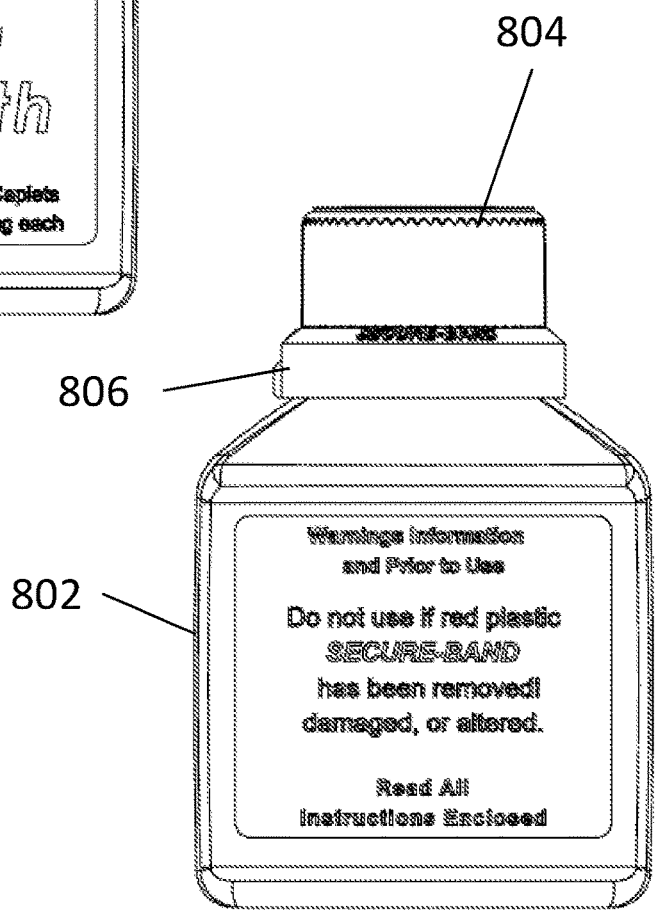
Figure 8C:
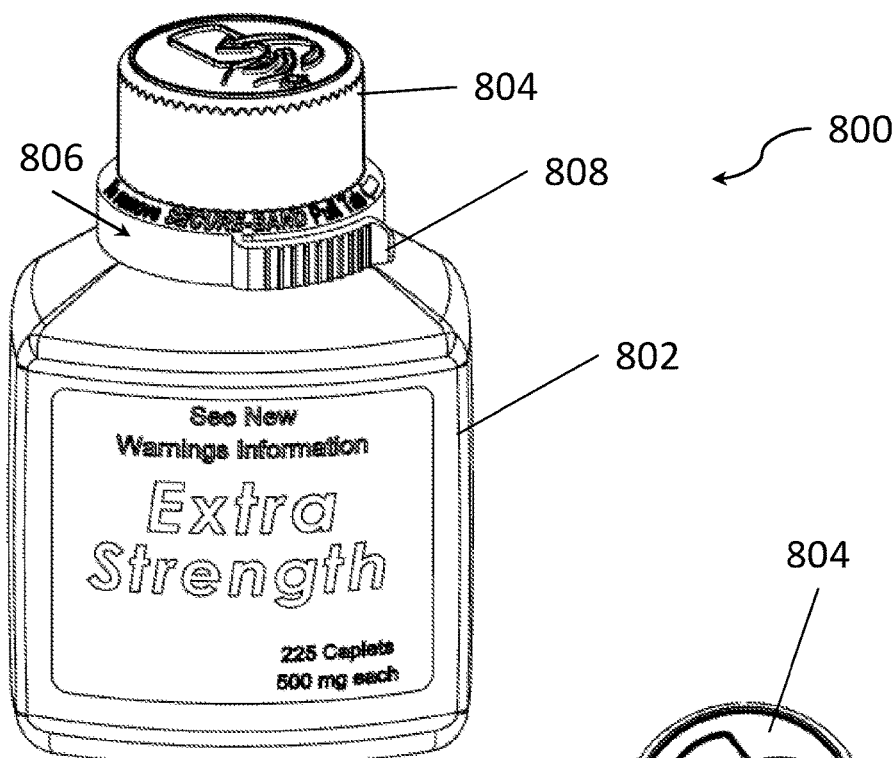
Figure 8D:
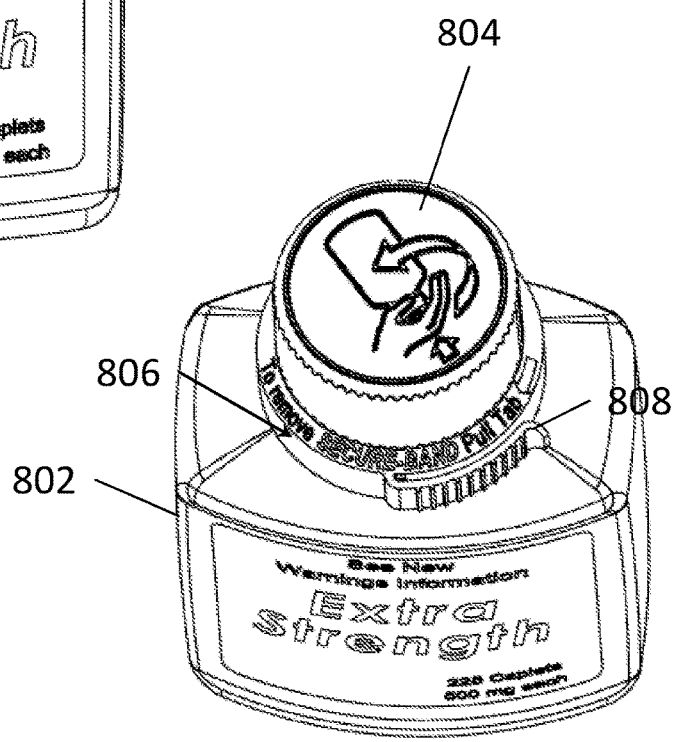
Figure 9A:
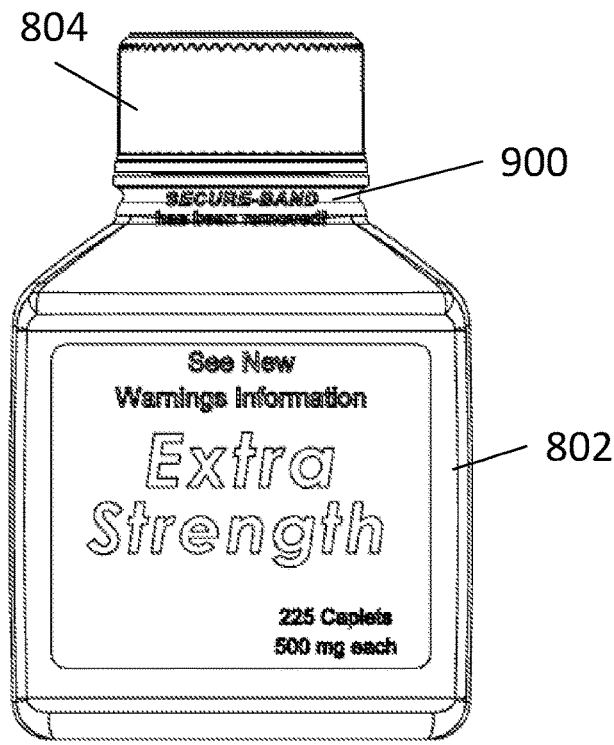
FIGS. 9A-9D are illustrations of the medicine bottle of FIGS. 8A-8D with the tamper band removed.
Figure 9B:
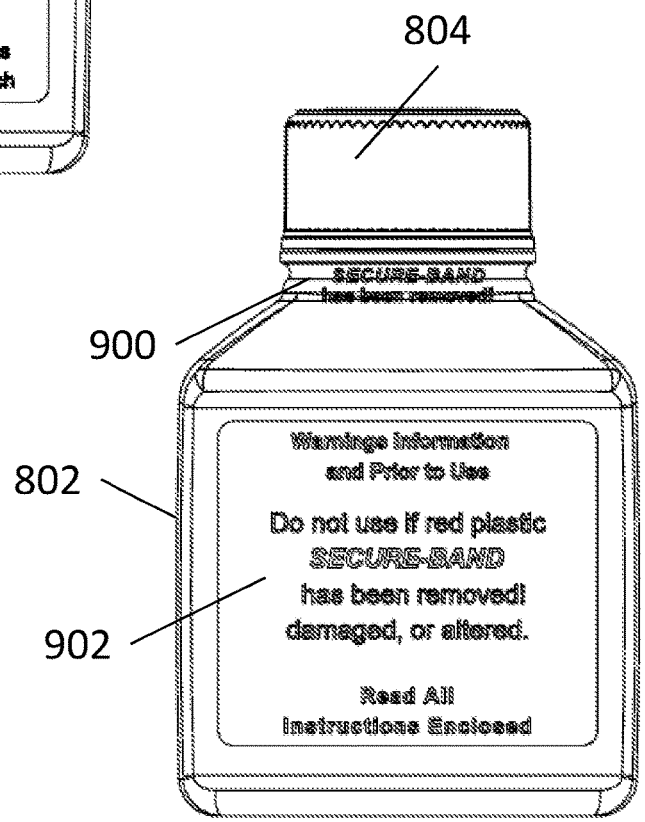
Figure 9C:
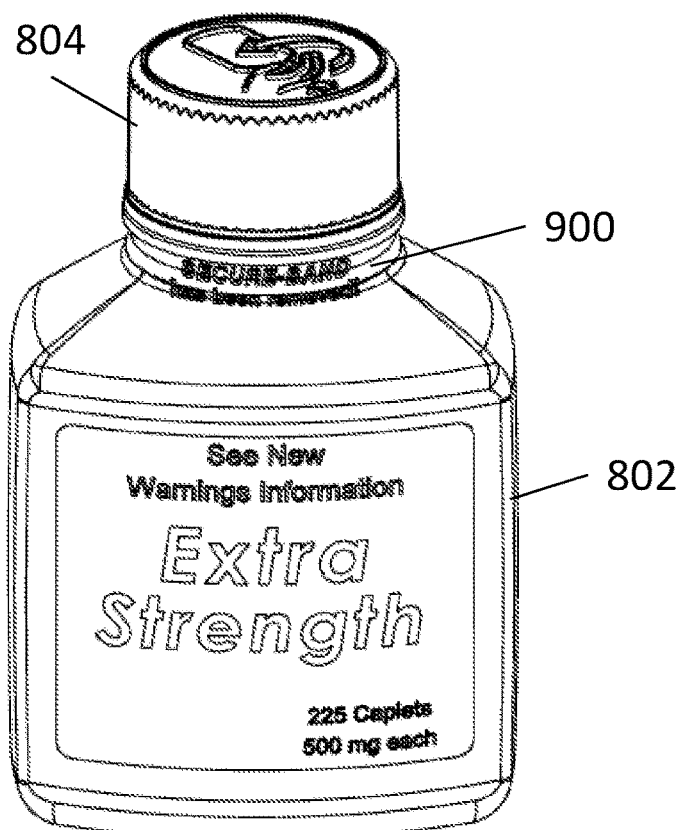
Figure 9D:
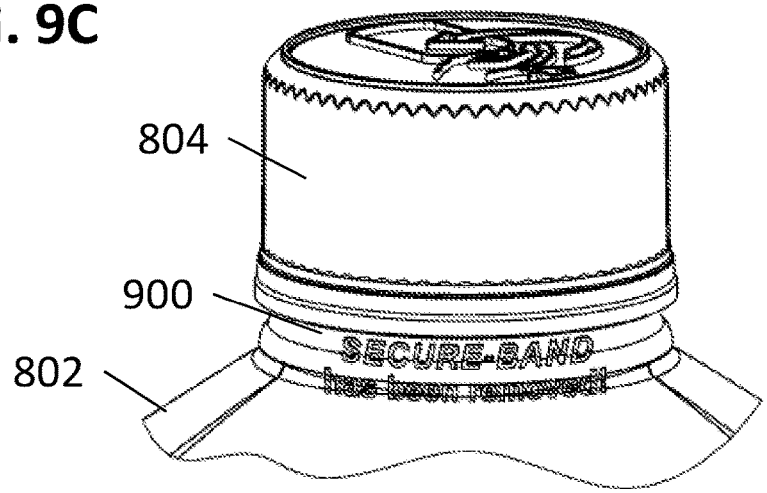
Figure 10:
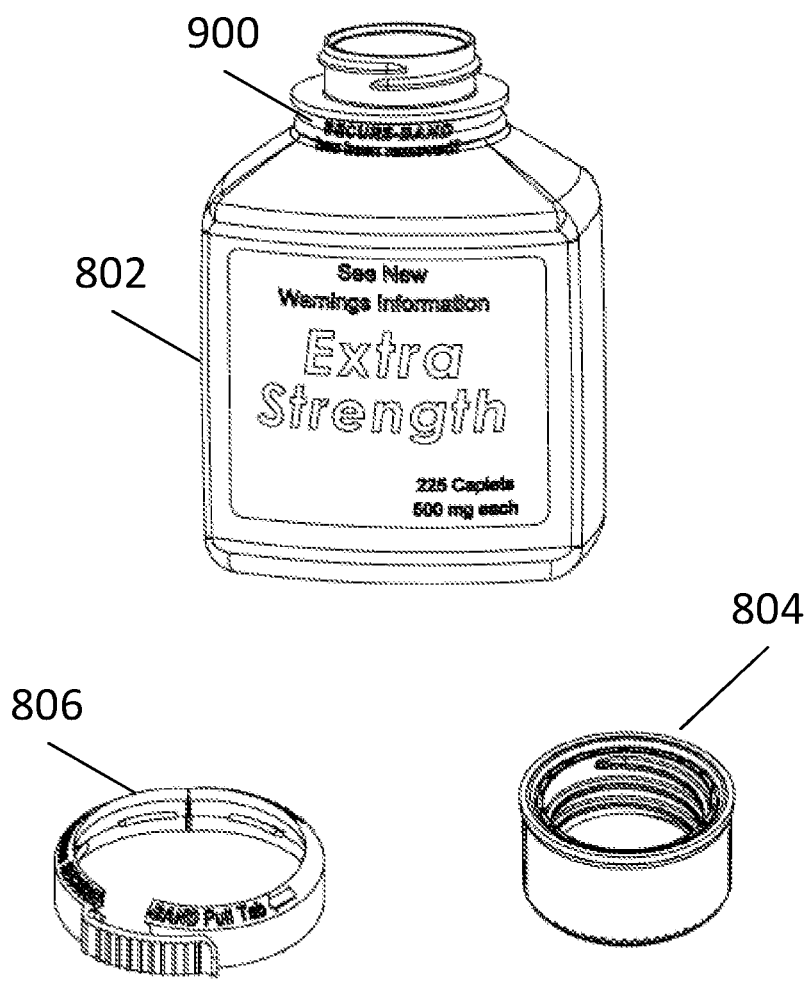
FIG. 10 is an exploded view of the medicine bottle of FIGS. 8A-9D.
Figure 11A:
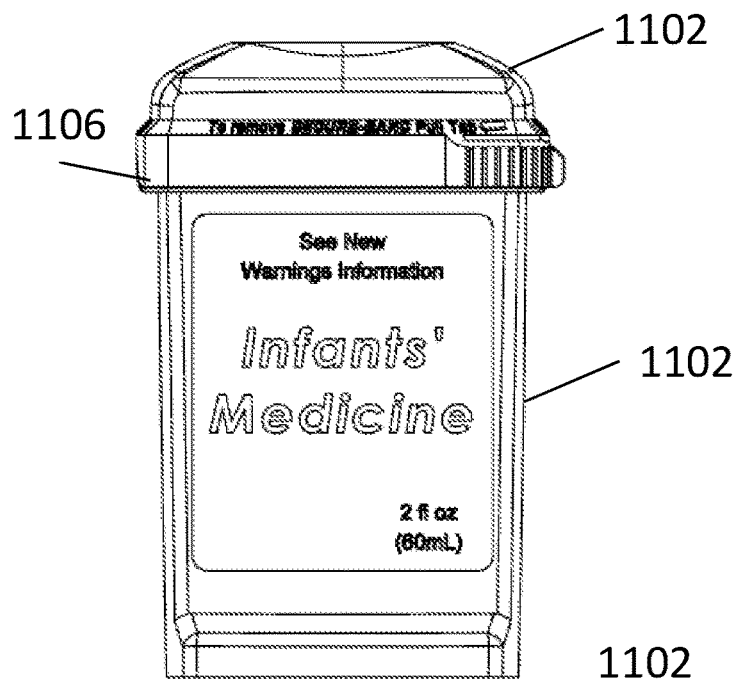
FIGS. 11A-11D are illustrations of an example of a non-circular medicine bottle sealed with a tamper band.
Figure 11B:
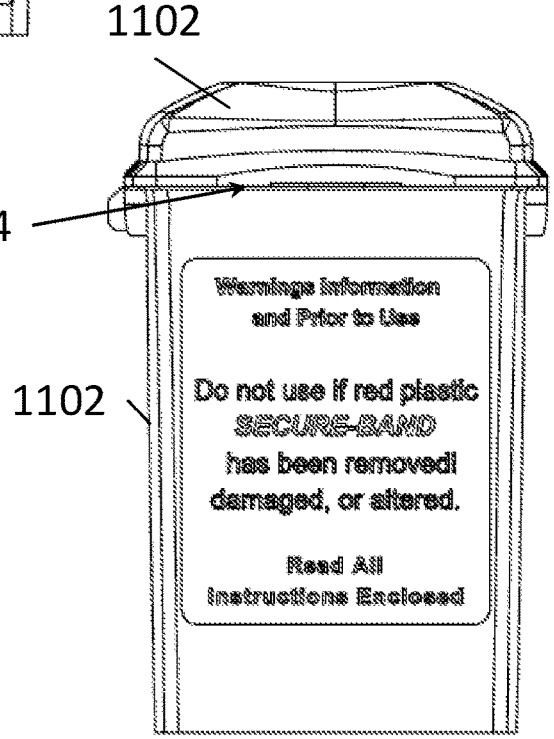
Figure 11C:
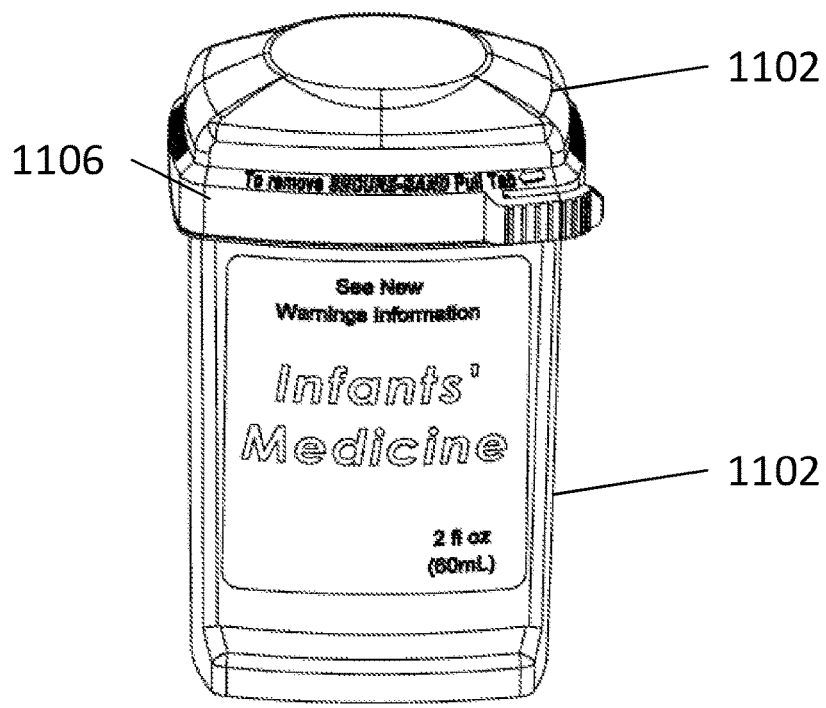
Figure 11D:
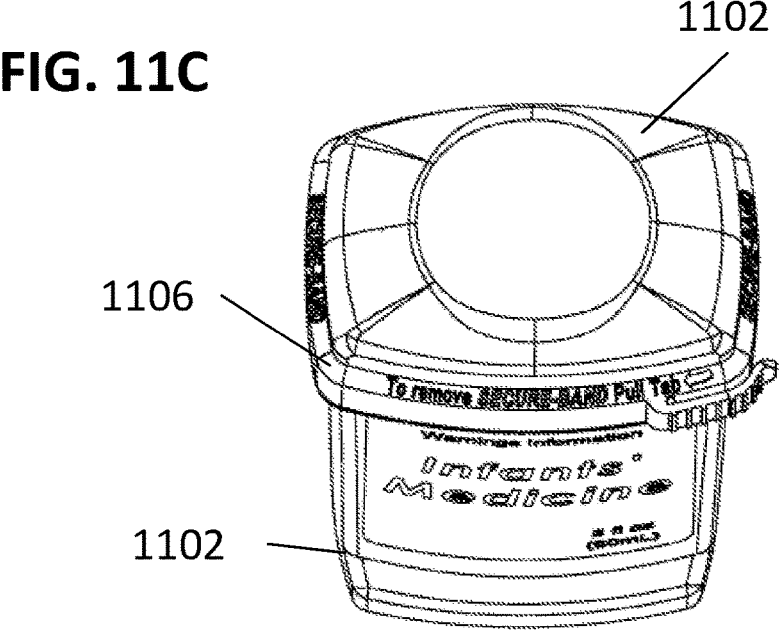
Figure 12A:
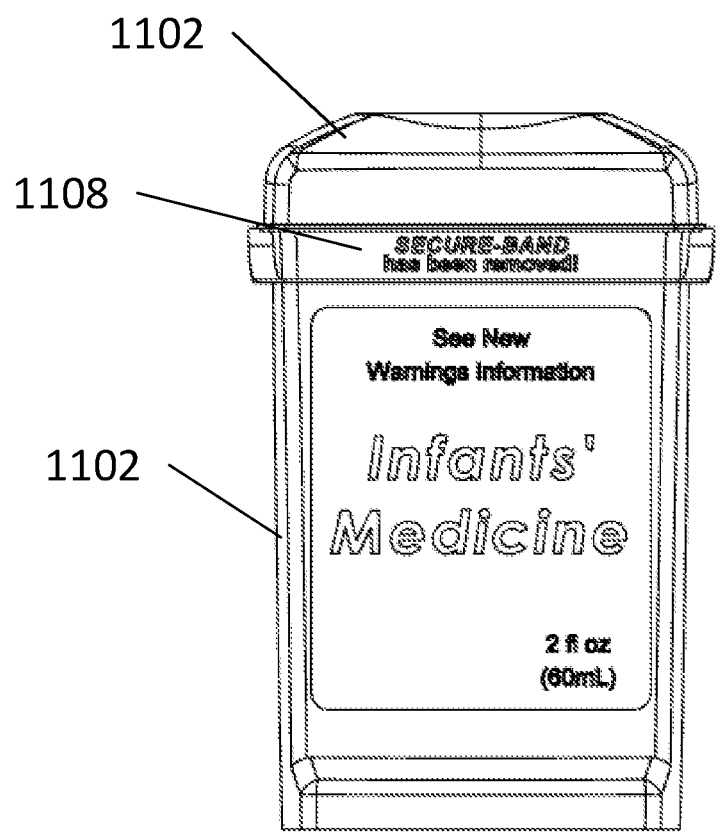
FIGS. 12A-12C are illustrations of the non-circular medicine bottle of FIGS. 11A-11D with the tamper band removed.
Figure 12B:
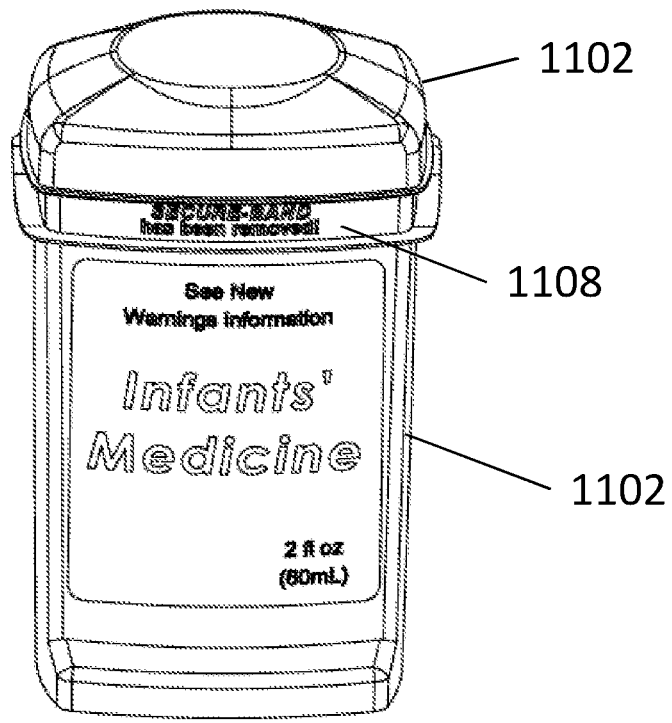
Figure 12C:
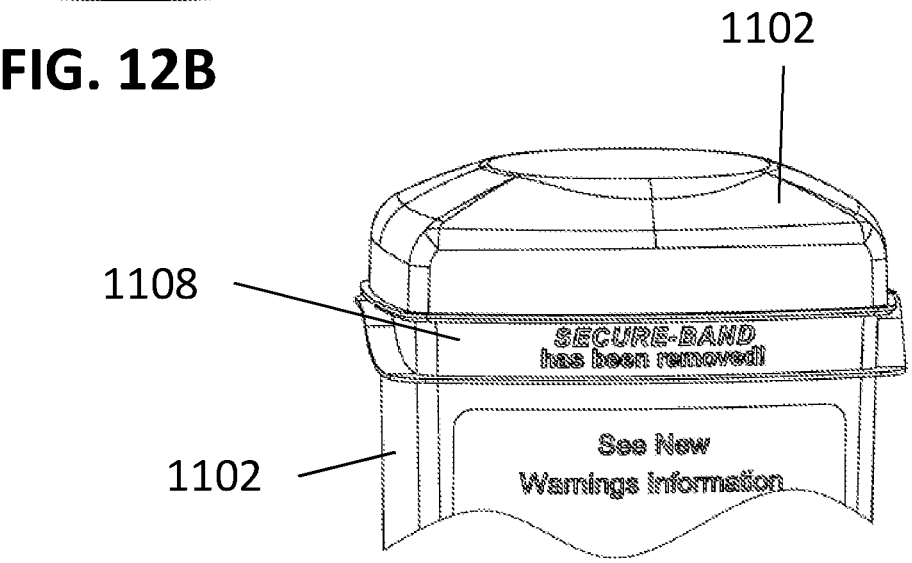
Figure 13A:
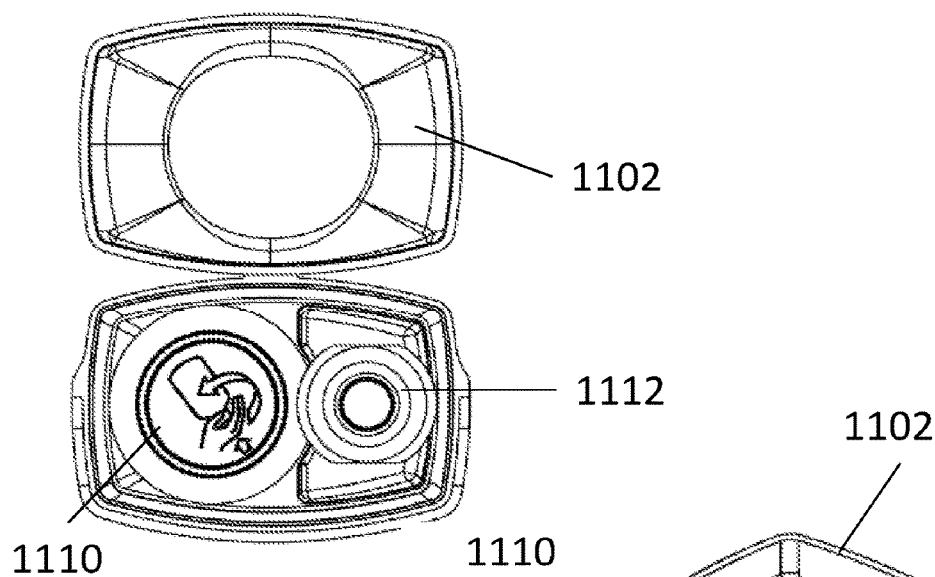
FIGS. 13A-13D are illustrations of the non-circular medicine bottle of FIGS. 11A-12C with the medicine bottle open.
Figure 13B:
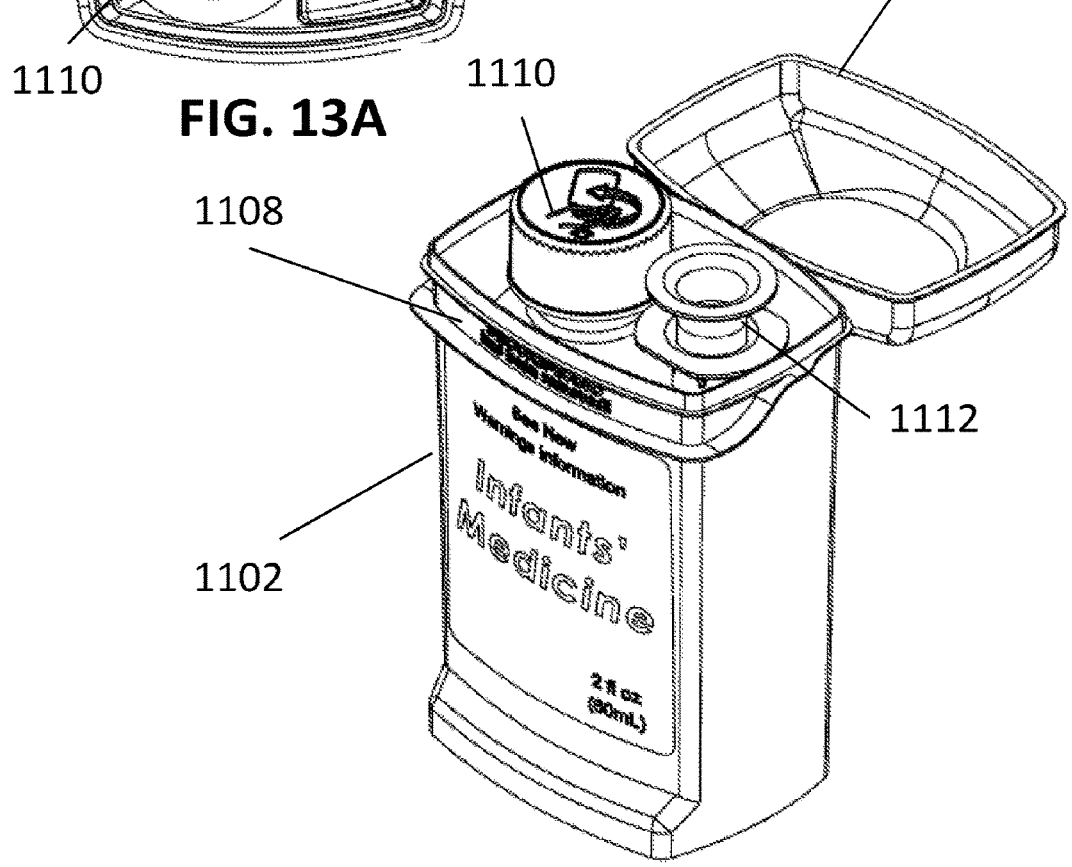
Figure 13C:
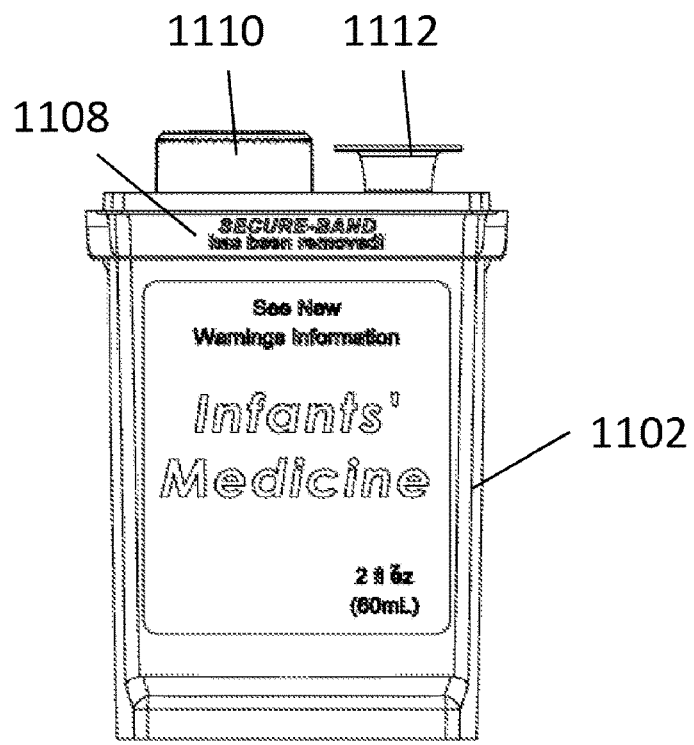
Figure 13D:
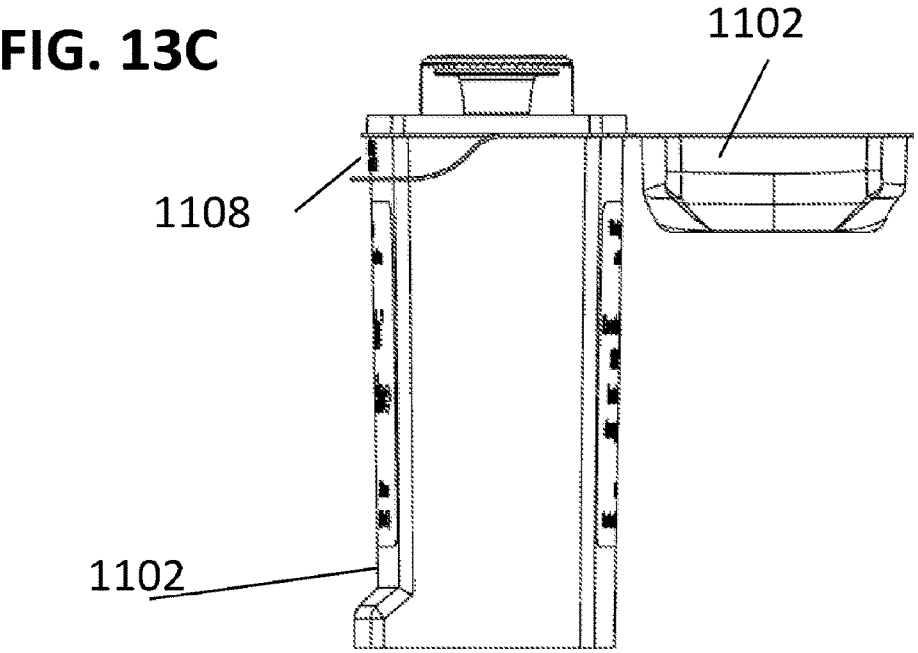
Figure 14:
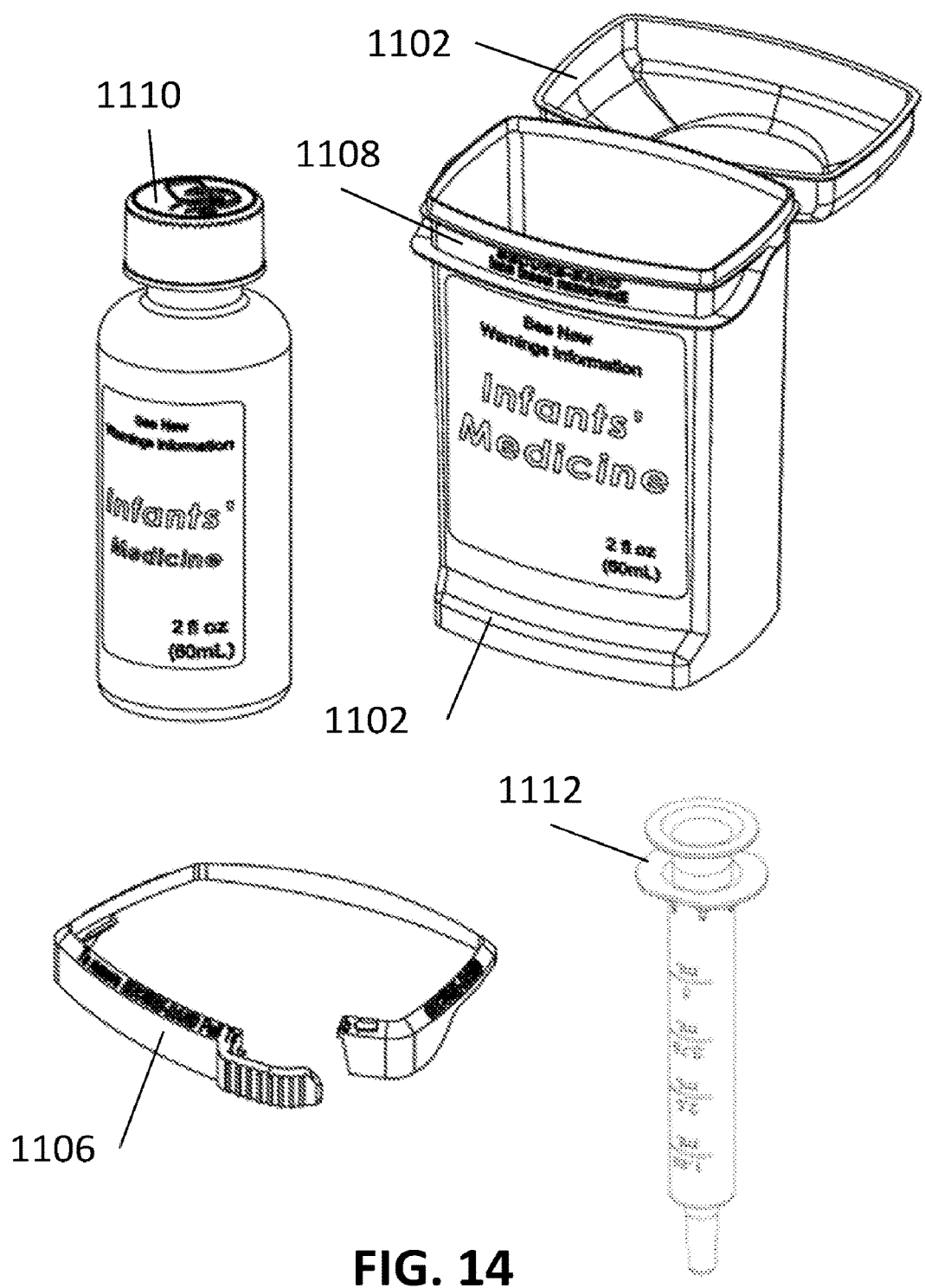
FIG. 14 is an exploded view of the medicine bottle of FIGS. 13A-13D.

FIGS. 7A-7C are illustrations of the exemplary medicine bottle 104 as the dose cup 102 and tamper band 106 are coupled or connected to the medicine bottle 104. As the tamper band 106 is placed on the medicine bottle 104, the indicator 200 located on the neck 706 of the medicine bottle 104 is covered by the tamper band 106. FIG. 7C shows a snap-on connector 404 as it is about to be snapped onto a ledge 700 on the bottle 104. For example, the dose cup 102 with the tamper band 106 attached can be manufactured at a first facility and thereafter transported to a second facility where it is fitted on a bottle 104. With application of force, the snap-on connectors 404 bend until the snap-on connectors 404 snap into an inverted state and retain the ledge 700 between the snap-on connectors 404 and an upper fitting 702. The snap-on connectors 404 are configured such that they are destructively attached to the bottle (e.g. cannot be inverted a second time without obviously degrading the snap-on connector). While a snap-on connection is described herein, it is to be understood that other suitable connections methods can also be used to connect the tamper band 106 to the medicine bottle 104.

In one embodiment, an assembly 108 is provided that includes the dose cup 102 and the tamper band 106 monolithically joined together. In some embodiments, the assembly 108 is formed by a two-shot method such that the dose cup 102 is formed from a first polymeric material and the tamper band 106 is formed from a second polymeric material that is different than the first polymeric material. The resulting assembly 108 is therefore formed of two dissimilar resins. In one embodiment, the first shot molding is a 12 melt index resin, that has a higher melt temperature "Pinnacle 1112". The second shot can be a 35 melt index resin like a Flint Hills P5M6K-048 that has a lower melt temperature approximately 30 to 50 degrees F. A scoring line is present at the junction between the dose cup 102 and the tamper band 106 such that the tamper band 106 can be removed from the dose cup 102. Although the overall assembly 108 is destroyed by the removal, the dose cup 102 remains intact. Due to the dissimilar resins, a perimeter of the opening of the dose cup 102 is cleanly severed from the tamper band 106 such that no burrs remain on the opening of the dose cup 102. This is particularly desirable in a dose cup because a consumer's lips would contact any such burrs and such contact diminishes the value of the product to the consumer.

In another embodiment, illustrated in FIGS. 8A-8D, a medicine container 800 includes a medicine bottle 802 and a cap 804. The cap 804 is monolithically joined to a tamper band 806. The tamper band 806 includes a tab 808 to facilitate removing the tamper band 806, such as by breaking the tamper band 806 along a score line (not shown). In an embodiment, the tamper band 806 couples the cap 804 to the medicine bottle 802. In another embodiment, the cap 804 is coupled to the medicine bottle 802, such as via a screw connection, and the tamper band 806 seals the cap 804 to the medicine bottle 802. As illustrated in FIGS. 9A-9D and 10, the medicine bottle 802 includes an indicator 900. When the tamper band 806 is removed, the indicator 900 is revealed, indicating that the tamper band 806 has been removed. The medicine bottle 802 can also include printed instructions 902 that notify the consumer that the product should not be used if the tamper band 806 has been removed.

Although the previous embodiments illustrate a medicine container with a dose cup having a round opening and a tamper band with a corresponding round circumference, other embodiments are also contemplated. For example, illustrated in FIGS. 11A-14, a square or rectangular tamper band 1106 can be used that forms a seal with a corresponding square or rectangular box 1102. For example, the tamper band 1106 can seal one or more edges of a plastic box 1102 that uses a living hinge 1104 on one edge of the box 1102. When the tamper band 1106 is removed, an indicator 1108 is revealed on the box 1102 to indicate that the tamper band 1106 was removed.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

What is claimed is:

1. A box assembly comprising:
    a box having an open end defined by a perimeter;
    a cap disposed at the open end of the box and defined by a perimeter, wherein the perimeter of the cap is greater than the perimeter of the box;
    a living hinge configured to pivotally couple the cap to the open end of the box; and
    a tamper band monolithically coupled to the perimeter of the cap, the tamper band being directly connected to the box by a destructively attached connection, wherein the tamper band is configured to sever from the cap with no burrs remaining on the perimeter of the cap,
    wherein the box comprises a first resin and the tamper band comprises a second resin that is dissimilar from the first resin.

2. The box assembly of claim 1, wherein the tamper band comprises a first color, the cap comprises a second color, and the box comprises a third color.

3. The box assembly of claim 2, wherein at least one of the first color, the second color, and the third color are different.

4. The box assembly of claim 1, further comprising a score mark between the tamper band and at least one of the cap and the box.

5. The box assembly of claim 4, wherein the score mark is configured to facilitate removal of the tamper band from the cap and the box.

6. The box assembly of claim 1, wherein the tamper band further comprises a plurality of snap-on connectors configured to couple the tamper band to the box.

7. The box assembly of claim 1, wherein the box further comprises an indicator configured to indicate that the tamper band has been removed.

8. The box assembly of claim 1, wherein the tamper band is square or rectangular.

9. A cap assembly comprising:
    a cap comprised of a first resin and having a perimeter; and
    a tamper band comprised of a second resin and monolithically coupled to the perimeter of the cap, wherein the tamper band is configured to sever from the cap with no burrs remaining on the perimeter of the cap, and wherein the first resin and the second resin are dissimilar.

10. The cap assembly of claim 9, further comprising a hinge configured to pivotally couple the cap to a box.

11. The cap assembly of claim 10, wherein the tamper band is configured to be directly connected to the box by a destructively attached connection.

12. The cap assembly of claim 11, wherein the box further comprises an indicator configured to indicate that the tamper band has been removed.

13. The cap assembly of claim 12, wherein the box is a medicine container.

14. The cap assembly of claim 9, wherein the tamper band is square or rectangular.

15. The cap assembly of claim 9, further comprising a score mark between the tamper band and the cap, wherein the score mark is configured to facilitate removal of the tamper band from the cap.

16. The cap assembly of claim 9, wherein the tamper band comprises a first color and the cap comprises a second color, and wherein the first and second color are different.

* * * * *